(12) United States Patent
Moll

(10) Patent No.: US 12,461,381 B2
(45) Date of Patent: Nov. 4, 2025

(54) SYSTEM FOR IMAGING A SCENE

(71) Applicant: AUDI AG, Ingolstadt (DE)

(72) Inventor: Tobias Moll, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 353 days.

(21) Appl. No.: 18/013,446

(22) PCT Filed: Jun. 9, 2021

(86) PCT No.: PCT/EP2021/065545
§ 371 (c)(1),
(2) Date: Dec. 28, 2022

(87) PCT Pub. No.: WO2022/002552
PCT Pub. Date: Jan. 6, 2022

(65) Prior Publication Data
US 2023/0266600 A1    Aug. 24, 2023

(30) Foreign Application Priority Data

Jul. 1, 2020 (DE) ...................... 10 2020 117 278.8

(51) Int. Cl.
G02B 27/42 (2006.01)
G02B 5/18 (2006.01)
(Continued)

(52) U.S. Cl.
CPC ....... *G02B 27/4227* (2013.01); *G02B 5/1814* (2013.01); *G02B 27/4272* (2013.01); *G02B 5/32* (2013.01); *H04N 23/45* (2023.01)

(58) Field of Classification Search
CPC .......... G02B 5/1814; G02B 5/32; G02B 6/00; G02B 27/4227; G02B 27/4272; H04N 23/45; H04N 23/741
See application file for complete search history.

(56) References Cited

U.S. PATENT DOCUMENTS 9,753,141 B2    9/2017  Grauer et al.
10,116,915 B2   10/2018 Mogalapalli et al.
(Continued)

FOREIGN PATENT DOCUMENTS

DE         102017217193 A1   3/2019
DE    10 2020 117 278.8      8/2021
(Continued)

OTHER PUBLICATIONS

Search Report, dated Mar. 1, 2021, in corresponding German Patent Application No. 10 2020 117 278.8 (5 pp.).
(Continued)

*Primary Examiner* — Daniel Petkovsek
(74) *Attorney, Agent, or Firm* — STAAS & HALSEY LLP

(57) ABSTRACT

A system for imaging a scene includes a capturing unit to capture two-dimensional and/or three-dimensional information of the scene, the information including light waves from the scene; a first diffractive optical element to receive the light waves from the capturing unit; a waveguide to forward the light waves received by the first diffractive optical element, the first diffractive optical element additionally to couple the light waves into the optical waveguide; and a second diffractive optical element to couple the light waves forwarded by the optical waveguide out of the optical waveguide. The system additionally includes a first image sensor and at least one second image sensor to capture the light waves coupled out of the optical waveguide and to generate first image data and second image data therefrom. The first image sensor and the second image sensor are in a region paired with the second diffractive optical element.

20 Claims, 2 Drawing Sheets

(51) Int. Cl.
  *G02B 5/32*       (2006.01)
  *H04N 23/45*     (2023.01)

(56)           References Cited

U.S. PATENT DOCUMENTS 10,962,787 B1 *   3/2021   Lou .................... G02B 6/0036
2008/0043114 A1   2/2008   Sung et al.
2019/0368932 A1   12/2019  Lantsov et al.

FOREIGN PATENT DOCUMENTS

JP      2015102613 A  *  6/2015    ............... G02B 5/18
WO      WO94/24527       10/1994
WO      WO-2018031634 A1 * 2/2018  ............... G02B 5/32
WO      WO2020/041620 A1  2/2020

OTHER PUBLICATIONS

International Preliminary Report on Patentability, dated Jan. 12, 2023, in corresponding International Patent Application No. PCT/EP2021/065545 (15 pp.).
Written Opinion of the International Searching Authority, dated Aug. 21, 2021, in corresponding International Application No. PCT/EP2021/065545 (6 pp.).
International Search Report, dated dated Aug. 21, 2021, in corresponding International Application No. PCT/EP2021/065545 (8 pp.).
PCT/EP2021/065545, Jun. 9, 2021, Moll, AUDI AG.
Chinese Office Action dated Jun. 14, 2025 for parallel Chinese Application No. 202180047372.8.

* cited by examiner

SYSTEM FOR IMAGING A SCENE

CROSS REFERENCE TO RELATED APPLICATIONS

This application is a U.S. National Stage Application which claims the benefit under 35 U.S.C. § 371 of International Patent Application No. PCT/EP2021/065545 filed on Jun. 9, 2021, which claims the priority benefit of German Patent Application No. 10 2020 117 278.8 filed on Jul. 1, 2020, the contents of each of which are incorporated herein by reference in their entireties.

BACKGROUND

Disclosed herein is a system for imaging a scene which system includes a capturing unit configured to capture two-dimensional and/or three-dimensional information of the scene, the information including light waves from the scene, a first diffractive optical element configured to receive the light waves from the capturing unit, an optical waveguide configured to forward the light waves received from the first diffractive optical element, the first diffractive optical element further configured to couple the light waves into the optical waveguide, and a second diffractive optical element configured to couple the light waves forwarded by the optical waveguide out of the optical waveguide.

From the printed matter U.S. Pat. No. 9,753,141 B1, a sensor-based imaging system with minimized delay time between sensor captures is known.

From the printed matter WO 94/24527, a spectrograph with multiple holographic optical transmission gratings is known, which diffract incident light such that different spectral components impinge on spatially separated regions of an optoelectronic detector.

From the printed matter U.S. Pat. No. 10,116,915 B2, a system for generating artificial or augmented reality with data capturing devices different from each other, which each comprise multiple sensors, is known. These data capturing devices, for example holographic cameras, collect scene information from their respective field of view (FOV).

In a holographic cam or briefly "holocam", light is coupled into a light guide by an optical element and forwarded up to a further outcoupling optical element by internal total reflection. A suitable image sensor is provided behind the outcoupling optical element.

Herein, the so-called sensor noise exerts a great influence on the achievable image quality. The sensor noise is representative of various disturbances, which influence the temporal course of a pixel value, for example from image to image. Therein, this so-called temporal noise includes photon noise, dark current, readout and quantization noise, local noise as well as offset noise and gain noise. Therein, the today's trend to increasingly smaller sensors with increasing resolution at the same time provides increasingly smaller and thereby less sensitive pixels and thus a greater noise susceptibility. However, the noise behavior of the captured image is not only depending on the size and sensitivity of the individual pixels.

The dynamic range is also an important capturing criterion. In image sensors, it is considerably lower than for example in the human eye. The effect is known from photography: If one looks out of a window, the eye is capable of seeing the darker interior as well as the brighter outside world. In contrast, a camera with considerably lower dynamic range usually only has the possibility of capturing one scene correctly exposed: the darker interior, wherein the window is overexposed, or the outside world, wherein the interior is considerably underexposed. While underexposed regions can be brightened again afterwards to a certain extent, information from overexposed regions cannot be recovered anymore.

Up to now, captures with extended dynamic range can basically arise in the following two manners. A capture can be digitally post-processed on the one hand. Usually, it is correctly exposed for the bright region, the dark region is subsequently brightened. Thus, the impression of a better illumination arises in the image. On the other hand, multiple individual captures with different settings, for example different exposure times, can be captured one after the other. Thus, multiple individual captures arise, which ideally cover suitable settings for the darkest up to the brightest image regions. These individual captures can then be composed, wherein the correctly exposed image portion is used from each capture. For example, bright regions are correctly captured and adopted in case of a short exposure time. In contrast, dark image regions are better exposed and adopted in case of a long exposure time.

SUMMARY

An aspect of the invention is to provide an improved system for imaging a scene, which allows a picture from the scene with an extended dynamic range on the one hand and reduces disturbances by sensor noise on the other hand.

Thus, a system for imaging a scene is disclosed. The system comprises: a capturing unit configured to capture two-dimensional and/or three-dimensional information of the scene, the information comprises light waves from the scene, a first diffractive optical element configured to receive the light waves from the capturing unit, an optical waveguide configured to forward the light waves received from the first diffractive optical element, the first diffractive optical element further configured to couple the light waves into the optical waveguide, and a second diffractive optical element configured to couple the light waves forwarded by the optical waveguide out of the optical waveguide. The system further comprises: a first image sensor and at least one second image sensor, which are configured to capture the light waves coupled out and to generate first image data and second image data therefrom, the first image sensor and the second image sensor being arranged in a region associated with the second diffractive optical element.

Instead of one capturing image sensor, herein, at least two image sensors are provided in the region of the outcoupling diffractive optical element. Thus, the image sensors can capture the scene from identical viewing angle, i.e. from the same position. This in turn allows combining the image data generated by the two sensors with each other. Thereby, an averaged picture of the scene reduced in noise can be created.

Therein, the region associated with the second diffractive optical element can have an area, into which the second diffractive optical element couples out the light waves, wherein the first image sensor and the second image sensor are arranged within the area.

In this context, the size of the second diffractive optical element can determine the size of the area, i.e. the size of the outcoupling region (also called "eyebox"). In other words, the size of the area, in which light waves of the scene are received, can be set by the size of the outcoupling second diffractive optical element such that the two image sensors can be arranged therein and can capture the same scene. It is also possible to select the size of the second diffractive element such that further image sensors can be integrated within the area.

In an example, the first diffractive optical element can comprise a first holographic optical element and the second diffractive optical element can comprise a second holographic optical element. The use of holographic optical elements, which are more lightweight and space saving than conventional optical elements, allows further simplifying the optical arrangement of the system and reducing weight.

The first holographic optical element and the second holographic optical element can comprise volume holograms, which couple the light waves into and out of the waveguide, respectively, corresponding to their wavelengths. Herein, the volume holograms can be employed as transmission as well as reflection gratings. Thus, different arrangements of the holographic elements in the waveguide can be realized.

In this context, the second holographic optical element can comprise further optical functions for image correction to for example reduce a distortion of the picture of the scene.

The first holographic optical element and the second holographic optical element can comprise photosensitive material, including photopolymer. Materials like dichromatic gelatin, silver halides, refractive crystals and/or the like are also possible.

The waveguide can comprise a prism. However, an arrangement with a waveguide comprising an optical fiber is also possible.

The first image sensor can have a first sensitivity and/or a first exposure time, and the second image sensor can have a second sensitivity different from the first image sensor and/or a second exposure time different from the first image sensor. By the differently sensitive image sensors in connection with varying exposure time, captures of the scene with great brightness differences are possible. For example, the first image sensor can capture bright image regions without overexposure, while the second image sensor can capture dark image regions without underexposure. The image data generated therefrom can be combined, which allows imaging the scene with an improved dynamic range.

The first image sensor and the second image sensor can further convert the photons associated with the light waves into electrical signals to generate the first image data and the second image data therefrom.

The first image sensor and the second image sensor can comprise CMOS sensors and/or CCD sensors.

Herein, the system can further comprise a processing unit (or processor), which processes the image data generated by the first image sensor and the second image sensor and generates a picture of the scene therefrom. Therein, the processing unit can additionally perform corrections.

The above aspect may also include a holographic camera with the previously described system for imaging a scene.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION

Figure 1:
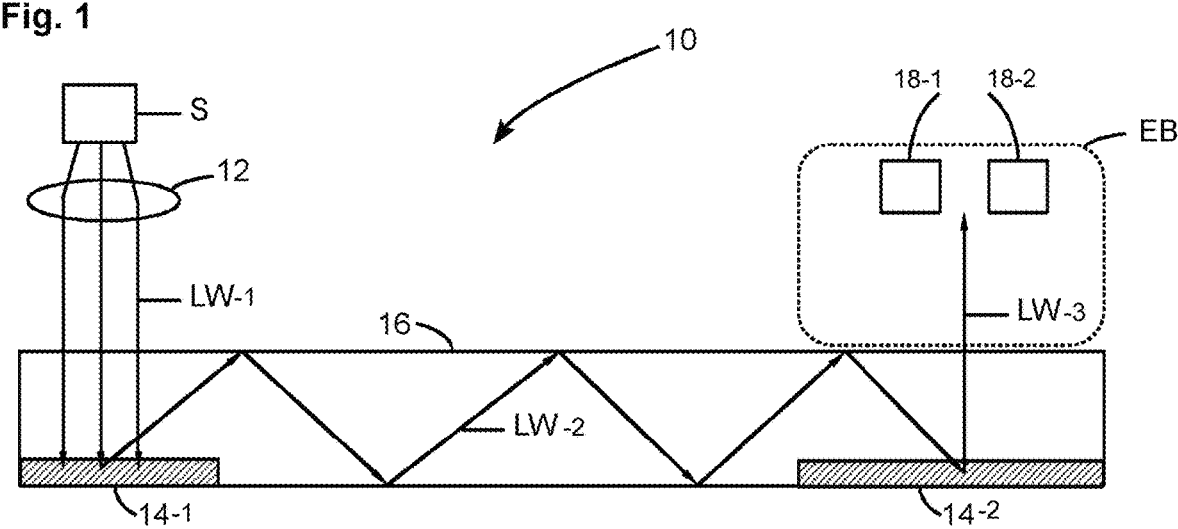
FIG. 1 shows an example of a system for imaging a scene.

Reference will now be made in detail to the embodiments, examples of which are illustrated in the accompanying drawings, wherein like reference numerals refer to like elements throughout.

Figure 2:
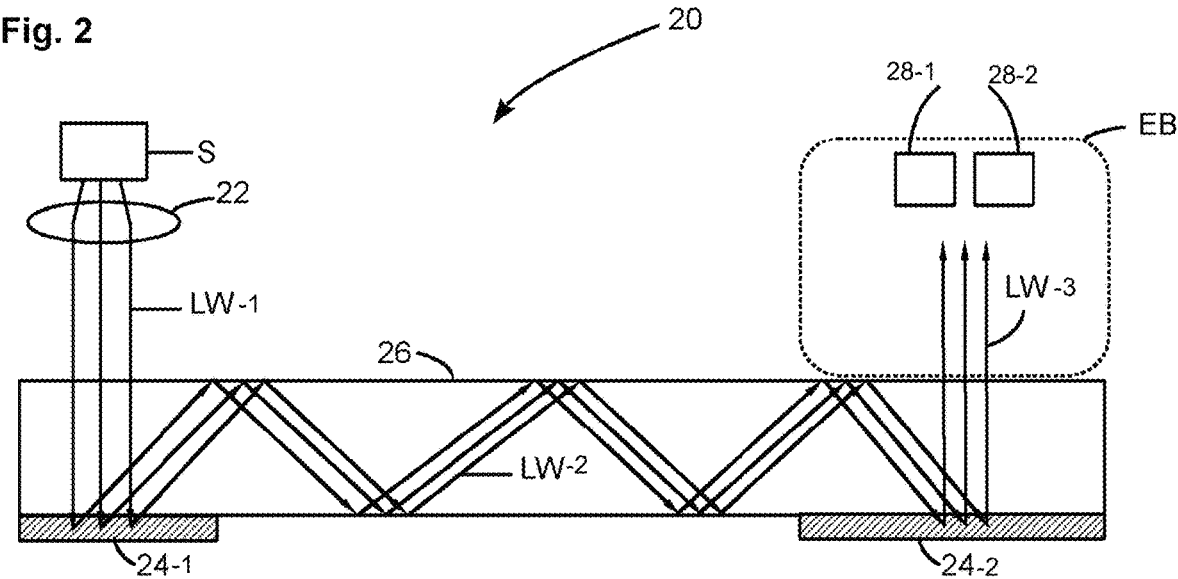
FIG. 2 shows an example of the system.
Figure 3:
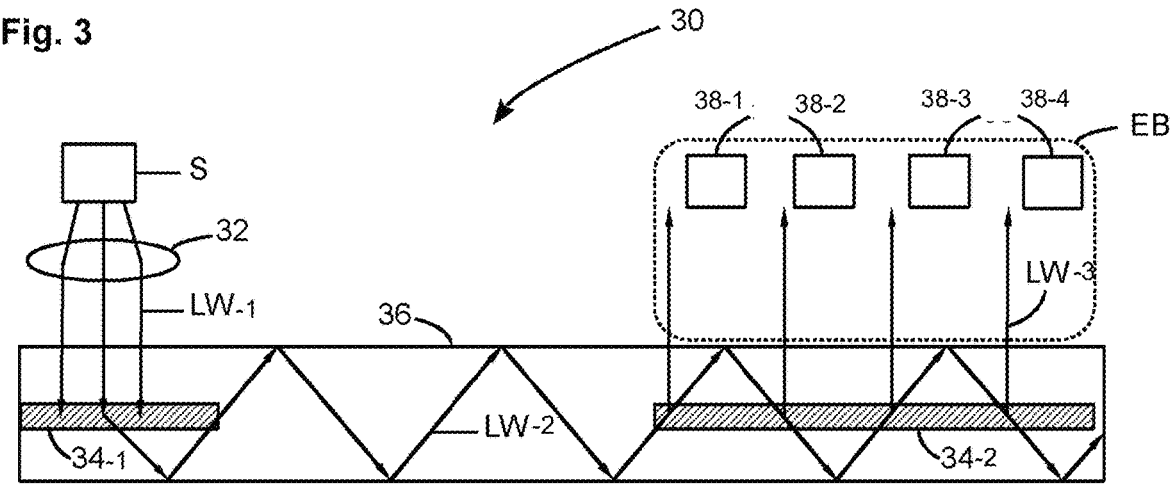
FIG. 3 shows an example of the system.

In FIG. 1 to FIG. 3, various examples of a system 10, 20, 30 for imaging a scene S are illustrated. The scene S can be an environment of the system 10, 20, 30. The system 10, 20, 30 comprises a capturing unit 12, 22, 32, a first diffractive optical element 14-1, 24-1, 34-1 and a second diffractive optical element 14-2, 24-2, 34-2, a waveguide 16, 26, 36 as well as a first image sensor 18-1, 28-1, 38-1 and at least one second image sensor 18-2, 28-2, 38-2, 38-3, 38-4.

The capturing unit 12, 22, 32 captures two-dimensional and/or three-dimensional information of the scene S, wherein the information includes light waves LW-1 from the scene S. The capturing unit 12, 22, 32, as illustrated in FIG. 1 to FIG. 3, can be formed as an objective with a lens, which images the light waves LW-1 to the first diffractive optical element 14-1, 24-1, 34-1. However, this is not restrictive. Similarly, the capturing unit 12, 22, 32 can be formed by further optical elements such as for example mirrors, shutters and/or the like.

The first diffractive optical element 14-1, 24-1, 34-1 receives the light waves LW-1 from the capturing unit 12, 22, 32 and couples them into the waveguide 16, 26, 36. The waveguide 16, 26, 36 forwards the light waves LW-2 received from the first diffractive optical element 14-1, 24-1, 34-1 to the second diffractive optical element 14-2, 24-2, 34-2 by total reflection. The second diffractive optical element 14-2, 24-2, 34-2 then couples the light waves LW-3 forwarded by the optical waveguide 16, 26, 36 out of the optical waveguide 16, 26, 36. This is illustrated by the corresponding arrows in FIG. 1 to FIG. 3.

Therein, various arrangements of the first diffractive optical element 14-1, 24-1, and 34-1 and the second diffractive optical element 14-2, 24-2, 34-2 in the system 10, 20, 30 are possible. The diffractive optical elements 14-1, 24-1, 34-1, 14-2, 24-2, 34-2 can for example be arranged within the waveguide 16, 36, which is illustrated in FIG. 1 and FIG. 3. However, they can also be arranged outside, which is illustrated in FIG. 2. According to requirement to the system 10, 20, 30, any arrangements can be realized herein.

The light waves LW-3 coupled out are then captured by the first image sensor 18-1, 28-1, 38-1 and the at least one second image sensor 18-2, 28-2, 38-2, 38-3, 38-4 and first image data BD-1 and second image data BD-2 are generated therefrom. This is described in detail with reference to FIG. 4 later. Herein, the first image sensor 18-1, 28-1, 38-1 and the at least one second image sensor 18-2, 28-2, 38-2, 38-3, 38-4 are arranged in a region EB associated with the second diffractive optical element 14-2, 24-2, 34-2, which is indicated by the dashed border in FIG. 1 to FIG. 3 in simplified manner.

The arrangement in the region EB allows the image sensors 18-1, 18-2, 28-1, 28-2, 38-1, 38-2, 38-3, 38-4 to capture the light waves LW-3 from the scene S from the same perspective. Thus, the generated image data can be combined with each other or averaged to obtain a picture of the scene AS reduced in noise.

In an example, the region EB associated with the second diffractive optical element 14-2, 24-2, 34-2 can have an area, into which the second diffractive optical element 14-2, 24-2, 34-2 couples the light waves LW-3 out, wherein the first image sensor 18-1, 28-1, 38-1 and the at least one second image sensor 18-2, 28-2, 38-2, 38-3, 38-4 are arranged within the area.

Herein, the size of the second diffractive optical element 14-2, 24-2, 34-2 determines the size of the area, i.e. the size of the outcoupling region, also referred to as "eyebox". By suitable choice of the size of the second diffractive optical element 14-2, 24-2, 34-2, the size of the area can be set such that further image sensors 382, 38-3, 38-4 can be arranged within the area, which is for example illustrated in the example shown in FIG. 3. In FIG. 3, the size of the second diffractive element 34-2 is selected such that four image sensors can overall be arranged in the area. However, this is not restrictive. Various sizes for the second diffractive optical element 14-2, 24-2, 34-2 and thus any number of image sensors 18-1, 18-2, 28-1, 28-2, 38-1, 38-2, 38-3, 38-4 can be realized. By combination of the image data BD-2 generated by the further image sensors, the image quality of the generated picture of the scene AS can be further improved.

The first diffractive optical element 14-1, 24-1, 34-1 can comprise a first holographic optical element and the second diffractive optical element 14-2, 24-2, 34-2 can comprise a second holographic optical element. Herein, the holographic optical elements have diffraction gratings, which are produced by holographic methods. These diffraction gratings are for example written or recorded into volume holograms.

The first holographic optical element and the second holographic optical element can comprise these volume holograms, which couple the light waves LW-1, LW-2, LW-3 into and out of the waveguide 16, 26, 36, respectively, corresponding to their wavelengths. More precisely, the light waves LW-1, LW-2, LW-3 are coupled in and coupled out, respectively, corresponding to the Bragg condition, i.e. the light waves LW-1, LW-2, LW-3 have to have the correct wavelength (color) and the correct shape (beam direction, wavefront profile). Herein, it is distinguished between volume holograms with reflection gratings as well as volume holograms with transmission gratings. In transmitting gratings, a part of the incident light waves LW-2 is reflected and a part is absorbed. In reflection gratings, the light waves LW-2 are diffracted for certain angles and wavelengths such that constructive interference arises. In FIG. 1, an example with reflection gratings is illustrated. Herein, the light wave LW-1 from the scene S is reflected as light wave LW-2 at the coupling-in first holographic optical element and forwarded to the second holographic optical element by total reflection, which then couples the light wave LW-3 out. In FIG. 1, it is a monochromatic (unicolored) construction, in which only light waves LW-2 with a certain wavelength are reflected. A polychromatic (multicolored) construction is also possible, it is illustrated in FIG. 2.

In FIG. 2, light waves LW-1, LW-2, LW-3 with different wavelengths are coupled in and coupled out, respectively. It can be realized by use of multiple holographic optical elements (not shown). The use of holographic optical elements with volume holograms, into which multiple diffraction gratings are written, is also possible.

In FIG. 3, an example is shown, which illustrates a monochromatic construction using transmitting gratings. In this example, the holographic optical elements are arranged centrally in the waveguide 36. Herein, a part of the incident light wave LW-2 is absorbed and a part is reflected.

As mentioned above, the examples illustrated in FIG. 1 to FIG. 3 are not restrictive. Further arrangements and combinations are possible.

Further, the second holographic optical element can comprise further functions for image correction. They can for example be written into the volume hologram and reduce additional disturbances like distortions upon coupling the light waves LW-3 out.

The first holographic optical element and the second holographic optical element can comprise a photosensitive material, preferably photopolymer. Photopolymer has a good diffraction efficiency and has the advantage that it does not have to be additionally chemically processed. Materials like dichromatic gelatin, silver halide and/or the like are also possible.

The waveguide 16, 26, 36 can comprise a prism. An optical fiber is also possible.

The first image sensor 18-1, 28-1, 38-1 can have a first sensitivity and/or a first exposure time, and the second image sensor 18-2, 28-2, 38-2, 38-3, 38-4 can have a second sensitivity different from the first image sensor 18-1, 28-1, 38-1 and/or a second exposure time different from the first image sensor. By the different sensitivities and/or exposure times, different regions of a scene S can be captured and combined with varying accuracy. Thus, the scene S can be imaged with all brightness differences. For example, the sensitivity and/or exposure time can be adjusted such that the first image sensor 18-1, 28-1, 38-1 captures bright regions of the scene S without overexposure and the second image sensor 18-2, 28-2, 38-2, 38-3, 38-4 captures dark regions of the scene S without underexposure. By combination of the generated image data BD-1, BD-2, for example a superposition of image data with different exposure times, a high-contrast image of the scene S can be generated. For example, a color image with extended dynamic range can also be generated with the polychromatic arrangement shown in FIG. 2.

The first image sensor 18-1, 28-1, 38-1 and the second image sensor 18-2, 28-2, 38-2, 38-3, 38-4 can convert the photons associated with the light waves LW-3 into electrical signals to generate the first image data BD-1 and the second image data BD-2, respectively, therefrom. This occurs by the photoelectric effect, wherein, presented in simplified manner, photons are absorbed by the image sensors and electrons or charges are induced.

Herein, the first image sensor 18-1, 28-1, 38-1 and the second image sensor 18-1, 28-1, 38-1, 38-2, 38-3, 38-4 can comprise a CMOS sensor and/or CCD sensors. In CMOS sensors (complementary metal-oxide-semiconductor), charges in a pixel are converted into a voltage. It is amplified, quantized and output as a digital value. CCD (charge-coupled device) sensors are composed of a plurality of extensively arranged light-sensitive semiconductor elements. Each semiconductor element represents a photodetector, which converts the incident photons into electrons.

Figure 4:
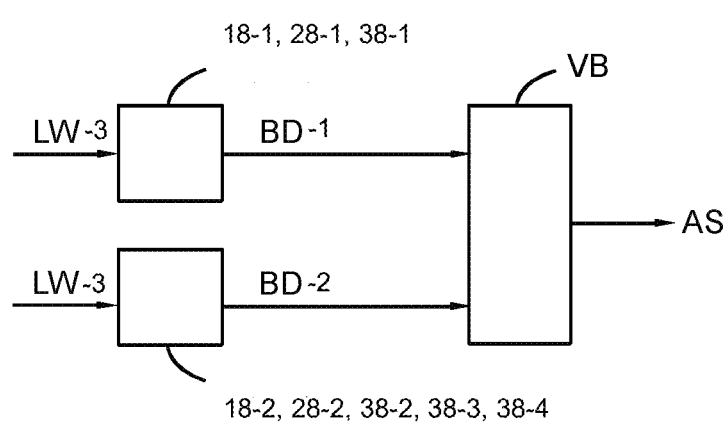
FIG. 4 shows an example of image sensors in cooperation with a processing unit of the system.

The system 10, 20, 30 can further comprise a processing unit VB, which processes the image data BD-1 generated by the first image sensor 18-1, 28-1, 38-1 and the image data BD-2 generated by the second image sensor 18-2, 28-2, 38-2, 38-3, 38-4 and generates a picture of the scene AS therefrom. In this context, FIG. 4 shows a simplified and schematic diagram of an example of the image sensors 18-1, 28-1, 38-1, 18-2, 28-2, 38-2, 38-3, 38-4 in cooperation with the processing unit VB of the system 10, 20, 30. The light waves LW-3 received by the first image sensor 18-1, 28-1, 38-1 and the second image sensor 18-2, 28-2, 38-2, 38-3, 38-4 are converted into image data BD-1 and BD-2, respectively, as described above and provided to the processing unit BV. It processes the image data BD-1, BD-2, wherein additional image corrections can be performed. The picture of the scene AS is generated from the processed image data BD-1, BD-2 by suitable combination.

Further, a holographic camera can be equipped with the above described system 10, 20, 30 for imaging a scene S.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A system for imaging a scene, the system comprising:
    a capturing unit configured to capture two-dimensional and/or three-dimensional information of the scene, the information comprising light waves from the scene;
    an optical waveguide configured to propagate the light waves received from the capturing unit;
    a first diffractive optical element configured to receive the light waves from the capturing unit and to propagate the light waves in the optical waveguide;
    a second diffractive optical element configured to receive the light waves propagated by the first diffractive optical element and to direct the light waves out of the optical waveguide; and
    a first image sensor and at least one second image sensor, each of which are configured to capture the light waves directed out of the optical waveguide and to generate first image data based on the light waves captured by the first image sensor and second image data based on the light waves captured by the at least one second image sensor, the first image sensor and the at least one second image sensor being in a region associated with the second diffractive optical element and capturing the information of the scene from an identical viewing angle.

2. The system according to claim 1, wherein the region associated with the second diffractive optical element comprises an area into which the second diffractive optical element directs the light waves out, and the first image sensor and the at least one second image sensor are within the area.

3. The system according to claim 2, wherein the size of the second diffractive optical element determines the size of the area.

4. The system according to claim 3, wherein the first diffractive optical element comprises a first holographic optical element and the second diffractive optical element comprises a second holographic optical element.

5. The system according to claim 2, wherein the first diffractive optical element comprises a first holographic optical element and the second diffractive optical element comprises a second holographic optical element.

6. The system according to claim 1, wherein the size of the second diffractive optical element determines the size of the area.

7. The system according to claim 6, wherein the first diffractive optical element comprises a first holographic optical element and the second diffractive optical element comprises a second holographic optical element.

8. The system according to claim 1, wherein the first diffractive optical element comprises a first holographic optical element and the second diffractive optical element comprises a second holographic optical element.

9. The system according to claim 8, wherein the first holographic optical element and the second holographic optical element comprise volume holograms which direct the light waves into and out of the optical waveguide, respectively, corresponding to their wavelengths.

10. The system according to claim 9, wherein the second holographic element comprises further optical functions for image correction.

11. The system according to claim 9, wherein the first holographic optical element and the second holographic optical element comprise a photosensitive material including photopolymer.

12. The system according to claim 8, wherein the second holographic element comprises further optical functions for image correction.

13. The system according to claim 12, wherein the first holographic optical element and the second holographic optical element comprise a photosensitive material including photopolymer.

14. The system according to claim 8, wherein the first holographic optical element and the second holographic optical element comprise a photosensitive material including photopolymer.

15. The system according to claim 1, wherein the optical waveguide comprises a prism.

16. The system according to claim 1, wherein the first image sensor has a first sensitivity and/or a first exposure time, and that the at least one second image sensor has a second sensitivity different from the first image sensor and/or a second exposure time different from the first image sensor.

17. The system according to claim 1, wherein the first image sensor and the at least one second image sensor convert photons associated with the light waves into electrical signals, to generate the first image data and the second image data therefrom.

18. The system according to claim 17, wherein the first image sensor and the at least one second image sensor comprise a complementary metal-oxide-semiconductor (CMOS) sensor and/or a charge-coupled device (CCD) sensor.

19. The system according to claim 1, further comprising a processing unit to process the image data generated by the first image sensor and the at least one second image sensor and to generate an image of the scene therefrom.

20. A holographic camera comprising:
    a system for imaging a scene, the system comprising:
        a capturing unit configured to capture two-dimensional and/or three-dimensional information of the scene, the information comprising light waves from the scene;
        an optical waveguide configured to propagate the light waves received from the capturing unit;
        a first diffractive optical element configured to receive the light waves from the capturing unit and to propagate the light waves in the optical waveguide;
        a second diffractive optical element configured to receive the light waves propagated by the first diffractive optical element and to direct the light waves out of the optical waveguide; and
        a first image sensor and at least one second image sensor, each of which are configured to capture the light waves directed out of the optical waveguide and to generate first image data based on the light waves captured by the first image sensor and second image data based on the light waves captured by the at least one second image sensor, the first image sensor and the at least one second image sensor being in a region associated with the second diffractive optical element and capturing the information of the scene from an identical viewing angle.

* * * * *